United States Patent [19]

Cooper et al.

[11] Patent Number: 5,492,143
[45] Date of Patent: Feb. 20, 1996

[54] FILTER SCREEN AND METHOD OF MAKING SAME

[75] Inventors: Robert J. Cooper, West Dundee; Carl E. Behrend, Lake Forest, both of Ill.

[73] Assignee: Eaton Corporation, Cleveland, Ohio

[21] Appl. No.: 115,960

[22] Filed: Sep. 2, 1993

[51] Int. Cl.⁶ .................................................. B01D 35/04
[52] U.S. Cl. ........................... 137/15; 137/550; 210/445; 210/448; 210/452
[58] Field of Search ................................ 137/544, 550, 137/15; 210/137, 445, 448, 452

[56] References Cited

U.S. PATENT DOCUMENTS

| 872,437 | 12/1907 | Leonard | 210/452 X |
|---|---|---|---|
| 1,156,274 | 10/1915 | Cormeny | 137/550 X |
| 1,331,732 | 2/1920 | Wait | 210/452 |
| 1,832,776 | 11/1931 | Hudson | 210/448 X |
| 1,971,120 | 8/1934 | Rice et al. | 210/448 X |
| 2,598,818 | 6/1952 | Muirhead | 210/448 X |
| 2,642,261 | 6/1953 | Gates | 137/550 X |
| 2,936,099 | 5/1960 | Smith | 210/448 X |
| 3,396,848 | 8/1968 | Kozel | 210/137 |
| 3,749,250 | 7/1973 | Oldford | 210/448 |
| 5,188,731 | 2/1993 | Lapoint, Jr. | 210/448 X |

*Primary Examiner*—John Rivell
*Attorney, Agent, or Firm*—Roger A. Johnston

[57] ABSTRACT

A filter for a valve inlet is drawn into a flat-bottomed cup shape from a blank of fine mesh woven screen and formed with an outwardly extending mounting flange of material folded back on itself. The region of the cup-shape proximate the flange is enlarged to a predetermined diameter for closely interfitting the flow passage into which the cup-shaped member is installed.

9 Claims, 1 Drawing Sheet

FILTER SCREEN AND METHOD OF MAKING SAME

BACKGROUND OF THE INVENTION

The present invention relates to a filter screen of the type employed in flow passages such as household plumbing systems for filtering particulate matter to prevent clogging and damage to appliances such as washing machines, dishwashers, ice-makers, and the like. Typically, filter screens are employed in such appliances at the inlet to the electrically operated inlet valve for preventing foreign particles in the plumbing and water supply from lodging in the valve and preventing closing of the valve.

Electrically operated appliance water inlet valves for the aforesaid types of appliances must, of necessity, provide very fine filtering of particles in order to prevent clogging and malfunction of the valve. Electrically operated appliance inlet valves typically employ pilot-operated mechanisms with very small diameter inlet passages which could be blocked by fine particulate matter in the water supply flowing through the valve. Furthermore, such valves typically employ rubber diaphragms as a movable valve member, which members are subject to erosion and tearing by foreign particles with sharp edges, such as silica sand and other crystalline materials encountered in typical household water supply systems.

Heretofore, filter screens for the aforesaid type appliance water inlet valves have been formed in a generally hat-shaped or domed configuration from screen materials having a fine mesh. Typically, the rim of the screen has been rolled to form an annular rib or reinforcement for mounting the screen in the valve inlet or flow passage. A common mounting technique has been to press-fit the rolled edge of the screen into the valve inlet. However, problems have been encountered in service with such dome-type inlet screens due to deformation of the screen during installation. The provision of the rolled edge for press fitting type installation of the screen in a bore necessarily reduces the diameter of the domed portion of the screen, and thus limits the amount of screen area available for filtering for a given passage size. Thus, it has been desired to provide for increased screen area for an inlet filter screen in a flow passage and yet provide for ease of installation and ready removal of the screen for field service.

SUMMARY OF THE INVENTION

The present invention provides an improved filter screen ;or a flow passage or valve inlet of the type requiring fine mesh screening for preventing passage of fine particles which would damage the valve and cause failure or leaking. The screen of the present invention is drawn from a flat blank of fine mesh stainless steel screen in a die, and is formed with a generally flat-bottomed cup-shaped configuration. The rim of the cup shape is folded back on itself to form a double thickness radially outwardly-extending flange which serves to locate and mount the screen in a counterbore or recess provided in the flow passage. Preferably the diameter of the screen in proximity of the flange is enlarged to predetermine diameter to aid in registering and locating the screen in the flow passage. The screen is preferably tapered in the region intermediate the flat bottom portion and the enlarged diameter adjacent the flange. The screen of the present invention provides increased surface area for filtering and improved ease of installation and removal for field service, and increased volume for containing trapped particles.

DETAILED DESCRIPTION

Figure 1:
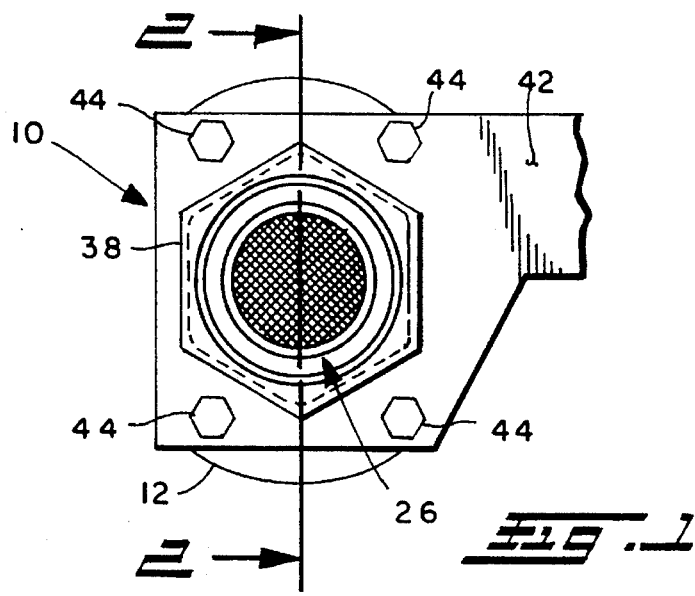
FIG. 1 is an end view of a valve inlet with the screen installed therein.
Figure 2:
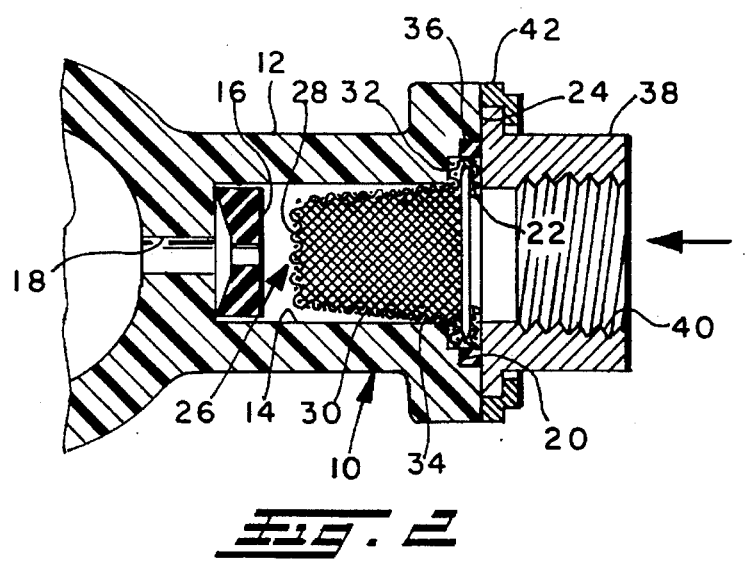
FIG. 2 is a section view, taken along section-indicating lines 2—2 of FIG. 1; and, FIG. 3 is a view similar to FIG. 2, of an alternative embodiment.

Referring to FIGS. 1 and 2, the filtering assembly indicated generally at 10 is shown as installed in a structure defining a flow passage therethrough which, in the present practice of the invention, comprises a valve body 12 defining an inlet passage 14 which communicates through an elastomeric flow control washer 16 to valving chamber inlet passage 18. Valve inlet passage 14 has, at the inlet end thereof, and annular recess or counterbore 20 which includes an annular groove 22 formed radially outwardly thereof on the endface 24 of the valve body.

A generally cup-shaped screen member denoted generally at 26 is formed with a flat bottom 28 and preferably tapered side portion 30, and with a radially outwardly-extended flange 32 formed by folding the screen material back upon itself radially inwardly is received in the inlet passage 14. The screen 26 has preferably an enlarged diameter portion 34 formed approximate, and immediately adjacent, the flange 32, which enlarged diameter portion is sized so as to locate the screen 26 radially in the passage 14. The flange 32 registers against the bottom of counterbore 22 to locate the screen axially in the bore 14. A suitable compressible elastomeric seal ring 36 is received in the recess 22, and is compressed therein by the flange of an inlet fitting 38 with external connection thereto. Fitting 38 is retained on the body structure 12 by a retaining bracket 42, which is secured to the body by suitable threaded fasteners 44, as illustrated in FIG. 1.

In the presently preferred practice, the screen 26 is formed of woven stainless steel mesh having a sieve size preferably in the range 40×40 to 80×80 wires per inch. It has been found satisfactory in the present practice of the invention to form the screen 26 from type 304 stainless steel wire mesh, although other suitable corrosion-resistant and formable materials may be used. In the present practice of the invention, the screen has a depth of about ⅝ of an inch (16 millimeters), and a diameter of about ½ inch (12.7 millimeters) for a typical appliance water inlet valve applications. It will be understood that the flange 32 of folded material has a height or depth slightly greater than the depth of the groove 22, such that the flange is slightly compressed by the face of the inlet fitting 38.

Figure 3:
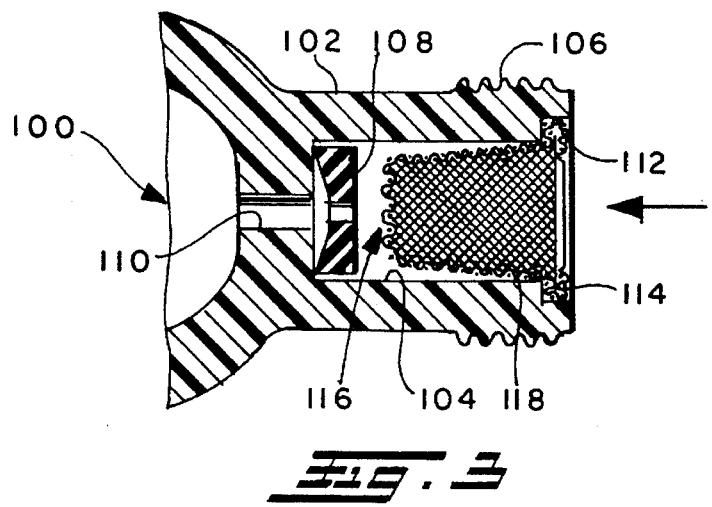

Referring to FIG. 3, an alternate embodiment of the present invention is illustrated, indicated generally at 100, and has a flow passage defining structure 102, which is in the presently preferred practice a valve body defining an inlet passage 104, and has external threads 106 provided thereon for attachment of a hose coupling thereto. Passage 104 communicates through elastomeric flow control washer 108 with a valving inlet passage 110. The inlet passage 104 has an enlarged diameter annular recess or counterbore 112 formed in the end thereof which has received therein the folded outwardly-extending flange 114 of a cup-shaped screen member indicated generally at 116, which is formed identically with the screen member 26 of the embodiment of FIG. 2. The screen member 116 is retained in the recess 112 by the hose attachment fitting. It will be understood that the screen 116 has an enlarged diameter portion 118 proximate the flange 114 which is sized to closely interfit the passage 104 for locating the screen therein.

The present invention thus provides a unique and novel configuration for a filter screen of the type employed for filtering water flow in a passage or valve inlet, and which provides increased area for filtering, increased particle entrapment volume, and improved location and retention in the flow passage. The screen of the present invention is formed from a single piece of woven stainless steel screen mesh, and employs a folded construction for an outwardly-extending flange to facilitate mounting of the screen in addition to a sized neck portion adjacent the flange for closely interfitting the flow passage. The screen of the present invention is readily removable for cleaning without incurring damage thereto and without causing contamination of the valve inlet.

Although the invention has been described herein with respect to the illustrated embodiments, it will be understood to those skilled in the art that the present invention is capable of variation and modification, and is limited only by the following claims.

We claim:

1. An assembly for filtering flow through a valve comprising:
   (a) valve body structure defining an inlet having a bore with an enlarged diameter region at the upstream end thereof;
   (b) a generally cup-shaped member formed of perforate material disposed in said inlet, said member having:
      (i) an annular flange extending outwardly from the open end of said cup-shape formed of material folded radially inwardly upon itself;
      (ii) a locating region adjacent said flange and sized to closely interfit said bore for locating said member in said inlet;
      (iii) a generally cylindrical region having a diameter significantly less than said bore and a generally flat closed end portion; and,
   (c) means retaining said member in said inlet.

2. The assembly defined in claim 1, wherein said member is formed of unitary construction of woven screen material.

3. The assembly defined in claim 1, wherein said member is formed of one piece of material and said flange is formed by folding said material radially upon itself.

4. The assembly defined in claim 1, wherein said means retaining said member includes an inlet fitting releasably attached to said body structure and axially compressing said flange.

5. The assembly defined in claim 1, wherein said cylinder region has a tapered configuration.

6. The assembly claimed in claim 1, wherein said body structure includes an annular recess in said inlet, with said flange nested in said recess.

7. A method of making a filter for a flow passage comprising:
   (a) providing a blank of woven screen material;
   (b) drawing said blank to a generally cup-shaped configuration and forming the closed end thereof to a flat-bottomed shape;
   (c) folding the rim of the open end outwardly and inwardly upon itself and forming an outwardly extending flange thereon; and,
   (d) inserting said cup-shaped in a bore and locating said cup shape by registering against said flange.

8. The method defined in claim 7, wherein the step of drawing includes forming a taper in said cup shape in the region adjacent said flat bottom.

9. The method defined in claim 7, wherein said step of drawing includes sizing the diameter of said cup shape in the proximity of said flange to a predetermined diameter larger than said flat bottom; and, the step of locating including registering against said predetermined diameter.

* * * * *